(12) United States Patent
Arsenault et al.

(10) Patent No.: US 6,512,519 B1
(45) Date of Patent: Jan. 28, 2003

(54) INFRASTRUCTURE FOR SHAPE EVENT HANDLERS

(75) Inventors: David Wayne Arsenault, Ithaca, NY (US); William James Dhimitri, Ithaca, NY (US); Walter Christian Welton-Lair, Ithaca, NY (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 09/428,595

(22) Filed: Oct. 27, 1999

(51) Int. Cl.[7] .................................................. G09G 5/00
(52) U.S. Cl. ........................ 345/441; 345/619; 345/764
(58) Field of Search ................................ 345/848, 764, 345/762, 441, 964, 440, 642, 619, 581, 606, 681, 682

(56) References Cited

U.S. PATENT DOCUMENTS

| | | | |
|---|---|---|---|
| 5,307,490 A | 4/1994 | Davidson et al. | 709/328 |
| 5,490,241 A | 2/1996 | Mallgren et al. | 345/440 |
| 5,513,309 A | 4/1996 | Meier et al. | 345/860 |
| 5,633,955 A | 5/1997 | Bozinovic et al. | 382/187 |
| 5,704,028 A | 12/1997 | Schanel et al. | 345/440 |
| 5,818,457 A | 10/1998 | Murata et al. | 345/629 |
| 5,856,828 A | 1/1999 | Letcher, Jr. | 345/420 |
| 6,025,849 A * | 2/2000 | Felser et al. | 345/441 |
| 6,219,056 B1 * | 4/2001 | Felser et al. | 345/744 |
| 6,232,983 B1 * | 5/2001 | Felser et al. | 345/649 |
| 6,275,228 B1 * | 8/2001 | Cataudella | 345/764 |

* cited by examiner

*Primary Examiner*—Raymond J. Bayerl
*Assistant Examiner*—Tadesse Hailu
(74) *Attorney, Agent, or Firm*—Gates & Cooper LLP

(57) ABSTRACT

A method, apparatus, and article of manufacture for creating a shape for displaying information on a monitor attached to a computer is disclosed. The method comprises the steps of creating a spatial frame of the shape wherein the spatial frame provides a mapping function for the shape and provides a geometric framework for the shape, creating at least one event handler of the shape, coupling the event handler to the shape, and using the event handler coupled to the shape to display desired information on the monitor.

18 Claims, 6 Drawing Sheets

INFRASTRUCTURE FOR SHAPE EVENT HANDLERS

CROSS REFERENCE TO RELATED APPLICATIONS

This application is related to the following and commonly assigned patent applications:

U.S. patent application Ser. No. 09/169,599, entitled "FRAMEWORK FOR OBJECTS HAVING AUTHORABLE BEHAVIORS AND APPEARANCES," by Lawrence D. Felser, et al., filed on Oct. 9, 1998, now U.S. Pat. No. 6,025,849, issued Feb. 15, 2000;

U.S. patent application Ser. No. 09/092,383, entitled "SHAPE OBJECTS WITH AUTHORABLE BEHAVIORS AND APPEARANCES," by Lawrence D. Felser, et al., filed on Jun. 5, 1998, now U.S. Pat. No. 6,064,386, issued May 16, 2000;

U.S. patent application Ser. No. 09/088,116, entitled "POSITIONING AND ALIGNMENT AIDS FOR SHAPE OBJECTS WITH AUTHORABLE BEHAVIORS AND APPEARANCES," by Lawrence D. Felser, et al., filed on Jun. 1, 1998, now U.S. Pat. No. 6,232,983, issued on May 15, 2001;

which applications are incorporated by reference herein.

BACKGROUND OF THE INVENTION

1. Field of the Invention

The present invention relates generally to graphical user interfaces, and in particular, to a method, apparatus, and article of manufacture for providing event handlers for shape objects with authorable behaviors and appearances.

2. Description of the Related Art

The use of Computer Assisted Drafting (CAD) application programs is well known in the art. Some CAD programs provide templates and palettes that help users create documents, graphical presentations, etc. However, these templates and palettes provide only limited assistance and do little to help the user connect standard CAD components, define new components, or define methods of manipulating the components within the CAD program.

Most standard components are predefined by the CAD program itself, leaving little room for the user to define custom shapes without using the predefined standard components as building blocks. A user must manipulate standard components to define a shape or outline, place them spatially proximate on a working screen, and then group them together using a grouping or wrapping function.

This multiple step approach of dragging components onto the screen and then modifying the components to create a new shape or outline within a document is inefficient and time consuming. Further, the process is not easily learned by a user, and makes it difficult to create shapes that are shared between users. Further, these limitations prevent many users from utilizing the CAD program to its fullest extent.

Many shapes also require the ability to change in conjunction with other shapes, e.g., when another shape is stretched, each shape associated with that shape must stretch in proportion to the stretched shape. Expressions that define properties in terms of other properties, or constraints that describe relationships between two or more geometric objects are common mechanisms for handling dependencies of this sort. However, expressions and constraints have limited ability to modify the form of a shape, or execute complex actions. For example, if a wall shape is made small enough, then a window shape attached to the wall shape may need to delete itself. A complex shape may also want to respond to stimuli other than a change to a shape. For example, a shape representing a file cabin et may want to redraw itself as "open" when the end user clicks on the shape with a pointing device.

Anticipating all of the possible behaviors of a shape is not possible. As such, the shape author needs a flexible mechanism for associating executable code, called an event handler, with a shape and controlling the execution of the code.

Consequently, there is a need in the art for improved techniques for creating components in a CAD program, in order to create documents faster. Further, there is a need in the art for improved techniques for creating components in a CAD program that eliminate the need for accessing toolbar or menu functions. There is also a need for components that can dynamically change with drawing conditions.

SUMMARY OF THE INVENTION

To address the requirements described above, the present invention discloses a method, apparatus, and article of manufacture for creating a shape to display information on a monitor of a computer. The method comprises the steps of creating a spatial frame of the shape wherein the spatial frame provides a mapping function for the shape and provides a geometric framework for the shape, creating at least one event handler of the shape, coupling the event handler to the shape, and using the event handler coupled to the shape to display desired information on the monitor.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
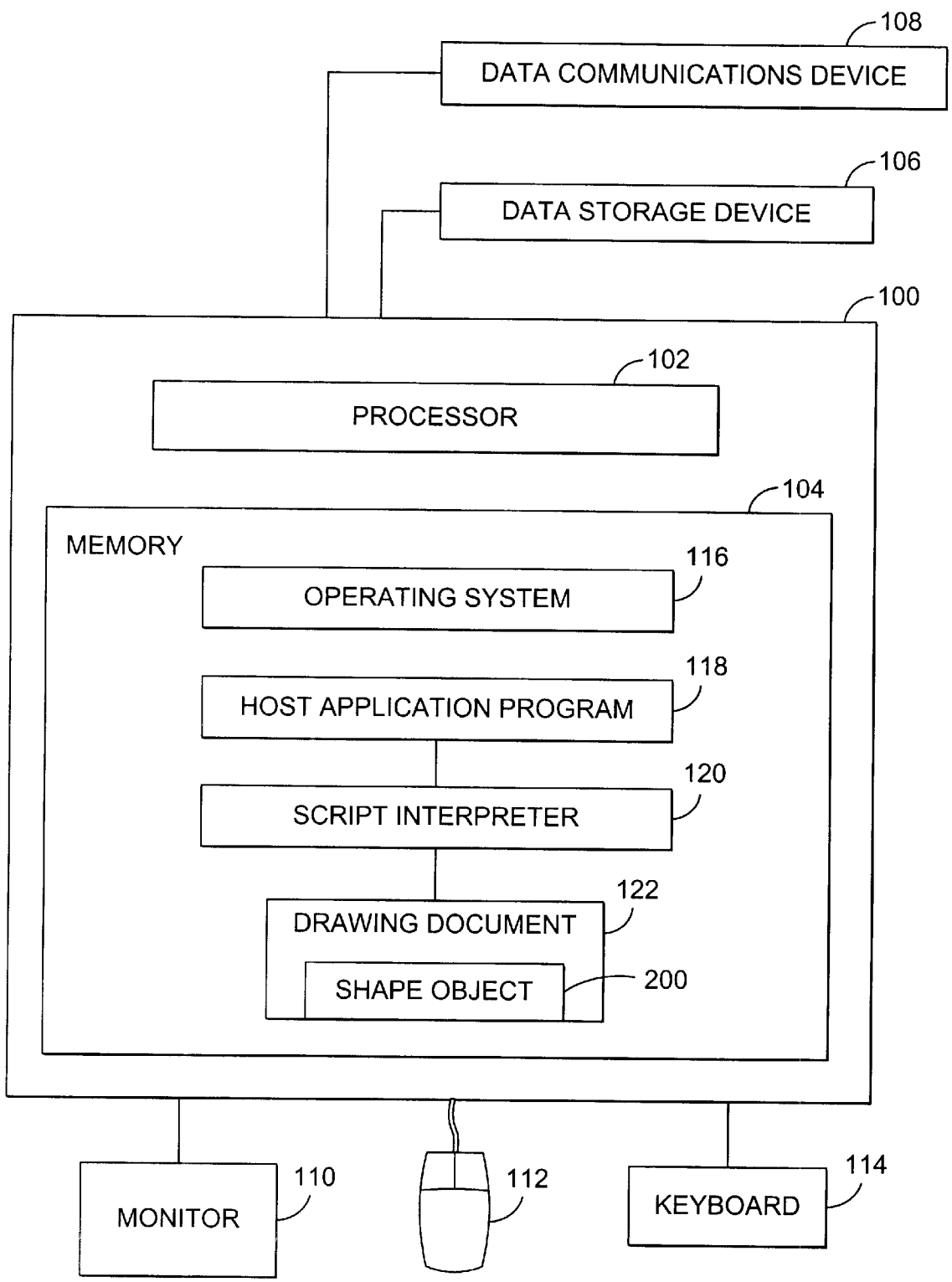
FIG. 1 is an exemplary hardware environment used to implement the preferred embodiment of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention is a computer-assisted drafting (CAD) program that provides intelligent shape objects, wherein the intelligent shape objects can be authored by a user. The intelligent shape comprises several objects for use in connecting, manipulating, displaying, mapping, and otherwise creating a new component or modifying an existing one. The intelligent shape programming also monitors the user's interaction with the CAD application program during execution of the sequence of steps, wherein handlers defined for the shape provide additional customization of the component during system operations.

Certain stimuli, e.g., shape size changing and user click, are two examples of shape events. A shape event is something that happens to a shape, or an object that a shape contains. The shape author needs both a rich set of events fired by the software that implements the shape and a mechanism for having an event handler executed when a specific event occurs.

It is often desirable to associate an event handler to the drawing that contains a set of shapes. In this way, a single event handler can be written to handle an event from any shape in the drawing. For example, in certain contexts, when one shape moves, other shapes associated with the first shape must move. Moving a master shape should move subordinate shapes. Moving a subordinate shape to a new master shape should rearrange the subordinate shapes reporting to both the old and new master shapes. It is possible to associate this intelligent event handler with each shape, though it is clearly more efficient to associate the event handler with the drawing instead.

Each type of event is described by a set of parameters. For example, the "click" event is described by the position of the pointer device. The "size change" event is described by the new size.

Thus, the present invention provides an infrastructure for describing events, firing events and routing the events to event handlers associated to different levels in the drawing hierarchy. Further, the present invention provides an infrastructure that is open-ended, such that it is easy to incorporate new events described by any number of parameters.

For example, some events are fired very frequently, e.g., the "size changed" event will be fired many times per second if the change is due to the user dragging a sizing handle. Because of this, the infrastructure needs to be very efficient. That is, the overhead for defining, firing and routing events needs to be minimal. Further, the event infrastructure must have the ability to allow both shape authors and $3^{rd}$ party application developers to write in-process compiled code, which gives the best possible performance.

An alternative to compiled code provided by the present invention is interpreted code, also called a script. Script event handlers provide very flexible shapes that would work in any scenario, without the need to install additional software outside of the drawing program context. Third party developers, as well as shape authors, want to have the ability to define their own events. If a developer wants the same event handler to run for each of three different events, having three copies of the event handler would be inefficient, especially if it is a complex event handler. Instead, the developer can use the present invention to send the same user-defined event from each of those three event handlers, and execute the desired commands, etc. from an event handler for that user-defined event.

The mechanism of the present invention also has the capability to fire an event whenever the value of property in a shape changes. Some properties have specific events, e.g., the (x, y) position properties of a handle, while other properties do not, like the visibility property of a shape.

Hardware Environment

FIG. 1 is an exemplary hardware environment used to implement the preferred embodiment of the invention. The present invention is typically implemented using a personal computer 100, which generally includes, inter alia, a processor 102, random access memory (RAM) 104, data storage devices 106 (e.g., hard, floppy, and/or CD-ROM disk drives, etc.), data communications devices 108 (e.g., modems, network interfaces, etc.), monitor 110 (e.g., CRT, LCD display, etc.), mouse pointing device 112 and keyboard 114. It is envisioned that attached to the personal computer 100 may be other devices such as read only memory (ROM), a video card, bus interface, printers, etc. Those skilled in the art will recognize that any combination of the above components, or any number of different components, peripherals, and other devices, may be used with the computer 100.

The personal computer 100 usually operates under the control of an operating system 116. The present invention is usually implemented in one or more application programs 118 that operate under the control of the operating system 116. The application program 118 is usually a CAD program or other graphics program. In the preferred embodiment, the application program 118 provides one or more script interpreters 120, a drawing document 122, and one or more intelligent shape objects 200.

Generally, the application program 118, script interpreters 120, drawing document 122, and intelligent shape objects 200 comprise instructions and/or data that are embodied in or retrievable from a computer-readable device, medium, or carrier, e.g., the data storage device 106, a remote device coupled to the computer 100 via the data communications device 108, etc. Moreover, these instructions and/or data, when read, executed, and/or interpreted by the computer 100 cause the computer 100 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that any combination of the above components, or any number of different components, including computer programs, peripherals, and other devices, may be used to implement the present invention, so long as similar functions are performed thereby.

Intelligent Shape Objects

Figure 2:
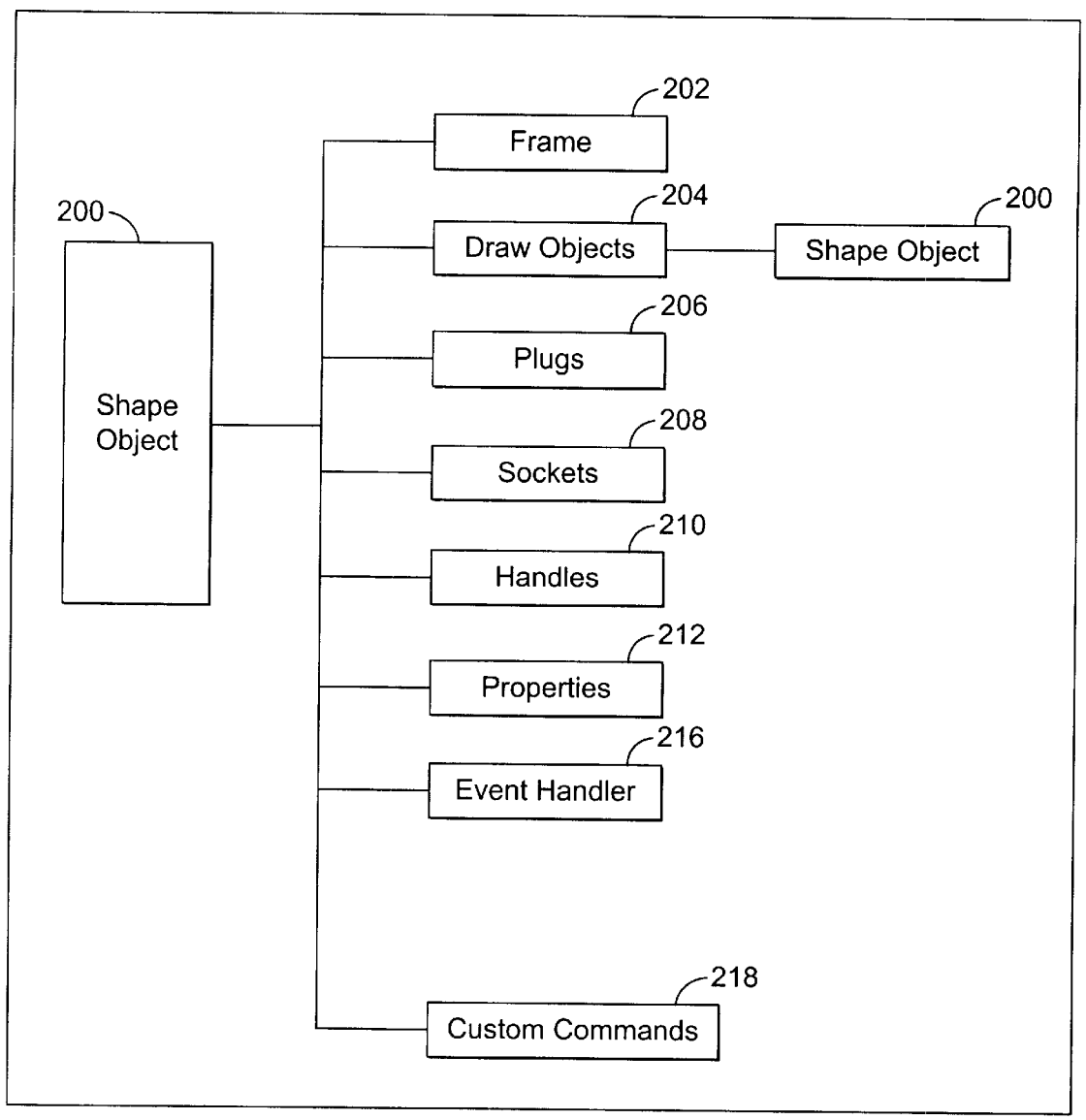
FIG. 2 illustrates the components of a shape object of the present invention.

FIG. 2 is a block diagram that illustrates the components of an intelligent shape object 200 according to the present invention. The intelligent shape object 200 is comprised of a number of different elements: (1) a spatial frame 202 that provides the underlying structure and spatial mapping for the intelligent shape object 200; (2) a draw objects collection 204 that includes zero or more objects of geometry along with zero or more other (subordinate) shape objects 200 that together make up the (superordinate) shape object 200; (3) zero or more plugs 206 and sockets 208 that provide connectivity to other shape objects 200; (4) zero or more handles 210 that provide direct manipulation of the shape object 200, thereby allowing the user to stretch or otherwise resize the shape object 200; (5) a properties collection 212 that contains additional authorable properties of the shape object 200, e.g., extended properties defined by authors of the shape object 200; (6) zero or more event handlers 216 that defines the behavior of the shape object 200 when the shape object 200 receives system level commands or inputs;

and (7) a custom command collection 218 that allows the author to define extended commands for the shape object 200. The frame 202, the draw objects 204, the plugs 206, the sockets 208, the handles 210, the properties 212, the event handlers 216, and the custom commands 218 may be imbued with data and logic that add intelligence to the shape object 200, in order to provide added convenience to the user.

The shape object 200 is authored (also called created) by specifying the values of the properties of the objects comprising the shape object 200. A property value can be an object, which gives shape objects 200 nesting capabilities. This aspect of adding new objects or replacing existing objects within a shape object 200 is part of the authoring process. Authoring is an activity that is external to the shape object 200; the shape object 200 source code, along with the source code for the objects within the shape object 200, are not affected by the authoring process. This bifurcation of the authoring activity from the shape object 200 allows the shape object to be authored statically or at runtime. The shape object 200 is then persistent until modified.

Shape objects 200 can be uniquely named, and can also generate events that reflect changes from the objects contained within shape object 200. External software can subscribe to these events, ensuring that the external software is notified of any changes to the shape object 200.

Example Shape Object

As an example, consider a shape object 200 that describes a chair. Such a shape object 200 has a geometry, which describes the paths used to render the appearance of the chair on a page. The shape object 200 may be composed of geometry that describes the chair's support members, with sub-shapes making up the seat, back, arms and other elements (and each of those shapes have their: own properties, geometry, and so on). This geometry is defined as the frame 202 of the shape object 200.

The chair may be modular, taking optional wheels, arms, and levers, each of which connects to the shape object 200. These connection points are defined via plugs 206 and sockets 208. The chair may come in two or three sizes, any of which may be invoked by dragging handles. This chair may have a variety of properties such as materials, costs, names, and catalog numbers. And the chair resides within the document page with respect not only to the page itself but also with respect to the other furniture and shapes that may also be included on the page. The intelligence built into the chair's shape object 200, plugs 206, sockets 208, handles 210, properties 212, and event handlers 216 provides the convenience of, for instance, adjusting cost with resizing, allowing or disallowing accessories (control levers, upholstery), enforcing consistent choices of seat, back, and arm designs, and whatever other relationships may be interdependent.

Frame

The frame 202 maps the spatial aspects of the elements of the shape object 200 to a particular space, notably the document page coordinate space. The frame 202 is a property of the shape object 200, and as such is under the control of the author of the shape object 200 and anyone else with access to the shape properties, including event handlers.

The frame 202 of a shape object 200 exposes a geometric framework to which the elements of the shape object 200 can be attached via expressions. The frame 202 also serves as a superstructure that relates all the other objects, some of which may be non-geometric, within the shape object 200.

In addition, the frame 202 characterizes the spatial aspect of the shape object 200 as a whole, to allow the interpretation of methods such as Move, Rotate and Mirror. Finally, the frame 202 provides the mapping, if any, between the inside of the shape object 200 and the outside of the shape object 200. Further, this invention lets the frame fire events when the size and/or position of the frame changes.

The frame 202 is a description of a coordinate space that maps the local (inside the shape object 200) space to a parent (outside the shape object 200) space. For example, a straight line internal to a polar frame becomes an arc outside the frame. The frame 202 can encompass one, two, or three dimensional spaces.

Several types of frames 202 can be envisioned: line frames, rectangular frames, and scaling rectangle frames.

A line frame 202 provides a frame 202 for a line shape object 200 that has a start point and an end point. The user can modify the start or end point and manipulate the start and end points of the line.

A rectangular frame 202 provides a frame for a shape object 200 that remains of constant scale, e.g., a chair that only comes in one size.

A scaling rectangle frame 202 provides a frame for a shape object 200 that expands and shrinks in size, e.g., a custom-built desktop should expand or shrink to fit a space exactly. However, a scaling rectangle frame 202 also encompasses frames that expand or shrink in increments, such as a cubicle wall, depending on what sizes are manufactured.

Draw Objects Collection

The draw objects collection 204 stores a set of zero or more draw objects. A shape object 200 uses a draw objects collection 204 to define the geometry for rendering the shape object's 200 appearance. At least one draw object 204 holds the geometry that makes up the shape object 200. The draw objects collection 204 is a standalone collection of objects to hold geometry for shapes and other objects. In addition, the draw object 204 can hold other shape objects 200 to fully define the shape object 200. A complex shape object 200 may comprise several draw objects 204, each of which may store some geometry as well as particular related sub-shape objects 200.

Plugs and Sockets

The plugs 206 and sockets 208 enable geometric and logical connections between shape objects 200. Plugs 206 enable one side of the connection, and sockets 208 enable the other side. Plugs 206 and sockets 208 can be designed to accept any type of mating connectors, or specific types of connectors, much like electrical plugs and sockets 208 used in a home to distinguish between 110VAC and 320VAC connections. For example, a deluxe chair shape object 200 may contain sockets 208 that accept only deluxe plugs 206 to disallow mating less expensive seats, backs, and arms to the deluxe chair shape object 200. Further, this invention lets plugs and sockets fire events when connecting or disconnecting.

Handles

The handles 210 are points located within the shape object 200 that are exposed to the user interface (UI) when the shape object 200 is selected. Handles 210 allow direct manipulation of geometry within the shape object 200, as well as any other shape object 200 parameter of collection element that can be referenced via expressions. Handles 210 have properties, such as x-y position, geometry, and define a relationship between the pointing device, typically a mouse, and handle position. With the handles 210 of the present invention, the shape author can constrain handles to particular range of motion as function of mouse movement. Typically, the handle 210 x and y coordinates are directly related to the mouse x and y coordinates. However, the handle 210 of the present invention allows the shape author to relate the handle x and y coordinates to any function, or a constant. For example, the shape author can equate the x coordinate of the handle 210 (handlex) to a constant, and the y coordinate of handle 210 (handley) to the y coordinate of pointing device 112. This would create a handle 210 that moves only in the y direction regardless of the x position of the mouse pointing device 112. The shape author can use any expression, e.g., trigonometric functions, equations, or other functions to constrain handle properties. The handle 212 position is thus independent of mouse position, and the shape author relates the handle 212 position to the mouse pointing device 112 position by using an expression to achieve any desired handle 212 motion. Further, this invention lets handles fire events when changing, which allow for much richer behavior than a simple expression would give.

Properties

The properties 212 are other custom or extended properties defined by the shape object 200 author not contained within the frame 202, handles 210, plugs 206, and sockets 208. For example, custom properties 212 can be a manufacturer code (a string), a price (a currency value) or a coefficient of friction for a given material. Properties 212 can also be defined for intermediate or scratch values within a shape object 200. Further, this invention lets extended properties fire events when their value changes. Since extended properties can have expressions defined in terms of any other property of a shape, or any object contained by a shape, we have a mechanism for firing an event when any property changes.

Custom Commands

In addition to the above, each shape object 200 has custom commands 218 that can be programmed by the user. The user accesses these custom commands 218 by using a context menu, typically accessed by using the right hand button on a pointing device 112. For example, the chair shape object 200 described above may have a custom command 218 associated with it to include a solid back on the shape object 200, or a carved back, or a padded seat, etc., depending on the desires of the user. Further, this invention allows custom commands to fire events whenever the command is selected for execution.

Event Handlers

The shape object 200, and the frame 202, plugs 206, sockets 208, handles 210, properties 212, custom commands 218 and draw objects 204 of the shape object 200 all have properties that can be evaluated using a mathematical expression instead of a constant value. An expression is, essentially, a one-line computer program that evaluates to a single value for use in the shape object 200. Variables that are referenced in expressions notify the expression holder on state and value changes. This capability is powerful enough to address challenges such as parametric geometry, associative dimensioning, connected objects, and simple physical simulations.

Some classes of the features of the shape object 200 require programs with a broader scope than expressions can generate. Examples are auto-routing connectors, stairs and fences (and other repetitive geometry), and walls. Programs addressing these problems need local variables, loops, conditional statements, and other constructs typical of simple programming languages. The present invention provides these programming constructs through the use of event handlers 216. One form of event handler is a string of text representing a script that persists with the shape object 200 and is interpreted by a script interpreter 120 in response to events.

A scripting language 120 is typically a subset of a major programming language. As an example, Visual Basic has a scripting language 120 called VBScript, and Java has a scripting language 120 called JScript. Scripts are designed to be small, interpreted programs that persist with the shape.

Event handlers 216 that act on shape objects 200 fall in a strategic domain of user programmability. Event handlers 216 are more versatile and more powerful than expressions. Event handlers 216 allow users to author shape objects 200 that respond to the programming environment, e.g., the host application program 118, create or delete the shape objects 200 geometry dynamically, override or complement standard shape object 200 behaviors, and perform other custom functions defined by the user.

Event Generation

Figure 3:
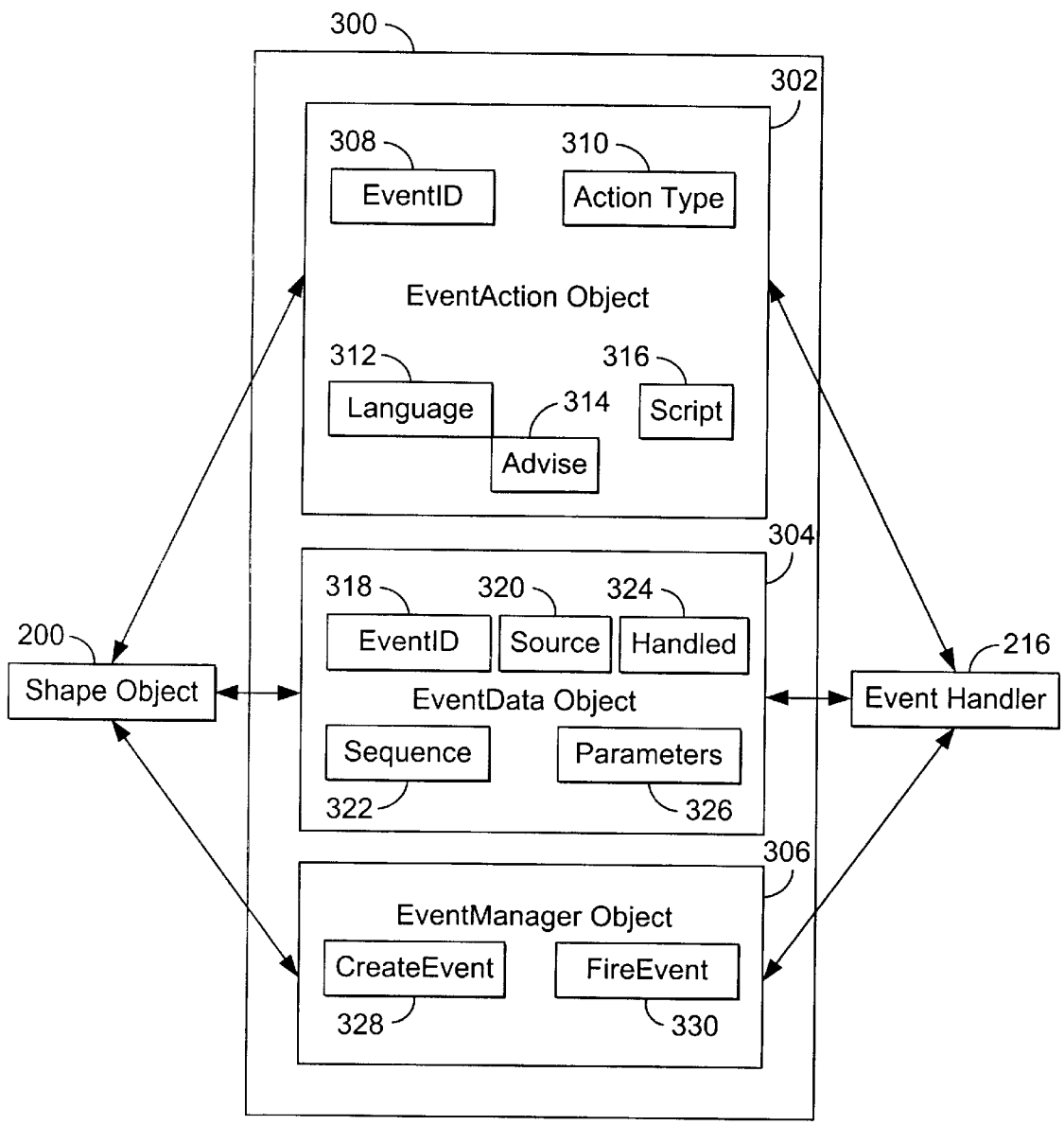
FIG. 3 illustrates the relationship between the shape object and the event handler of the present invention.

FIG. 3 illustrates the relationship between the shape object and the event handler of the present invention.

The shape object 200, and the frame 202, plugs 206, sockets 208, handles 210, properties 212, custom commands 218 and draw objects 204 of the shape object 200 generate events 300, that can occur before or after a modification of the shape object.

Some Examples are:
BeforeRectFramePositionChange: Sent (Fired) by a rectangular frame 202 before the rectangular frame moves;
RectFramePositionChanged: Fired by a rectangular frame 202 after it moves;
BeforeHandleChange: Fired by a handle 210 before handle 210 moves;
HandleChanged: Fired by a handle 210 after it moves;
BeforePropertyChange: Fired by a property 212 before property 212 value changes;
PropertyChanged: Fired by a property 212 after its value changes;
BeforeCommandExecute: Fired by a command 218 before command 218 executes;
CommandExecute: Fired by a command 218 after it executes, etc.

Other events 300 can be generated by other standard or custom event generating occurrences within shape object 200.

Events 300 generated by shape object 200 or one of its constituent objects are defined by a set of parameters. For example, the parameters for BeforePropertyChange are the property 212 object and the proposed new value.

Events 300 may define parameters for the Event Handler to modify. For example, all "Before" events have a cancel parameter. The Event Handler can set Cancel=True to prevent the action from happening. For example, if the Event Handler sets Cancel=True in the BeforePropertyChange event then the Property change will not happen. This allows the Event Handler to do complex validation.

An initial source object fires each event 300. For example, the frame object 202 is the source object that fires the BeforeRectFramePositionChange and RectFramePosition-Changed events. The handle object 210 is the source object that fires the BeforeHandleChange and HandleChanged events. It is said that the event 300 fires on an object.

The infrastructure also has a mechanism to route events 300 up the object hierarchy, such that the event fires on the parent of the source object and then on the parent of that object and so on until the top of the object hierarchy is reached. For example, the HandleChanged event will be fired on the handle 210, then the shape object 200, then the drawing document 122 that owns the shape 200, then the application 118 that owns the document. This mechanism of hierarchical event firings is called event bubbling.

The mechanism of the present invention can also be used by the shape author or other external user to associate the event handler for a specific event to any object that an event may be fired on. Using the same example, an event handler 216 for the HandleChanged event can be associated with a handle 210, shape object 200, page, document 122 or application 118 object.

The mechanism can also prevent further propagation of an event 300, e.g., from a handle 210 to the object 200. This is done by providing a syntax that allows an event handler 216 indicate that no further event bubbling is necessary.

Event Handler 216 is a software program that can take several forms. Event handler 216 can be a script, e.g., VBScript or JScript, or a separate common object module (COM) object that implements the IAxEventHandler interface. Event handler 216 must interface with shape object 200, and all of the parts of shape object 200. Further, there can be multiple event handlers 216 for a given shape object 200, as well as multiple event handlers 216 for a given host application program 118 and/or Event 300.

Events 300 are defined and managed by objects, such as EventAction Object 302, EventData Object 304, and EventManager Object 306.

EventAction Object

EventAction Object 302 associates a given event handler 216 with a shape object 200. EventAction Object 302 comprises several properties, namely EventID 308, ActionType 310, Language 312, Advise 314, and Script 316.

EventID 308 determines the type of event 300 that the event handler 300 should respond to for the shape object 200. For example, if event handler 216 is to respond to all events where a handle 210 is changed, a value can be set in EventID 308 to force event handler 216 to respond to all HandleChanged type events.

ActionType 310 specifies if the event handler 300 is a script, which is interpreted by a script interpreter 120, or a COM object.

Language 312 determines the language that the event handler is using when the ActionType 310 is specified as a script. Examples of language 312 are VBScript and JScript, as well as other script 120 languages.

Advise 314 is a reference to a COM object when the ActionType 310 is specified as COM.

Script 316 specifies the textual string to be interpreted by the script interpreter 120 that is to be used by event handler 216 when the ActionType 310 is specified as Script.

EventData Object

EventData Object 304 is the object that encapsulates the data for a single event fired by a shape object 200 or other object. This object is passed to the event handler 216. EventData Object 304 comprises several properties, namely EventID 318, Source 320, Sequence 322, Handled 324, and Parameters 326.

EventID 318 specifies the type or name of an event 300 that the data is to be encapsulated for.

Source 320 specifies the object that the event 300 is being fired at. This includes the event bubbling of the event, e.g., source 320 may specify the handle 210, but the bubbling of that event 300 would fire the event 300 at the shape object 200, the drawing document 122 that contains shape object 200, etc.

Sequence 322 specifies is a unique number associated with each event 300 fired during a particular session of application 118. The events 300 that are fired during a session of the application 118 are numbered sequentially, e.g., the first event 300 is sequence 322 "1," the second event 300 is sequence 322 "2," etc.

Handled 324 is a boolean flag that is set by the event handler 216 if the event handler 216 wants to end the event bubbling mechanism.

Parameters 326 are a list of parameters necessary to define the event 300.

EventManager Object

EventManager Object 306 controls the definition of events, controls the firing of events at shape objects 200, and controls the bubbling of events up the object hierarchy. EventManager Object 306 can perform a CreateEvent 328 or a FireEvent 330.

CreateEvent 328 is used to create an event that is to be used. Create Event 328 returns an EventData Object 304 to an object that is about to fire an event 300.

FireEvent 330 is used to send or "fire" an event 300 on a source object. The call to a FireEvent 330 passes EventData Object 304 and specifies source 320.

Associating Event Handlers

The present invention uses EventAction Objects 302 to associate event handlers 216 with specific events 300. It is possible, and sometimes desirable, to add multiple EventAction Objects 302 for a specific EventID 308.

Plugs 206, sockets 208, handles 210, properties 212 and commands 218, as well as shape objects 200, can own zero or more EventAction Objects 302. A shape object 200 with several handles 210 may want to associate a different HandleChanged event handler 216 with each handle 210. If the HandleChanged event handler 216 is placed on the shape object 200 instead of the handle 210, then the first task for the event handler 216 will be to determine which handle 210 is changing.

Creating and Firing Events

Any object, specifically the shape object 200, Plugs 206, sockets 208, handles 210, properties 212 and commands 218, can generate events. In addition, if a shape object 200 contains other shape objects 200 as members of the Draw Object 204 collection, then that sub shape 200 can also generate events.

The EventManager Object 306 is obtained prior to firing an event. There is only one EventManager Object 306 in a session, so obtaining the object may be as simple as accessing a global variable. An EventData Object 304 is then created using the EventManager Object 306 CreateEvent 328 method. The properties of the EventData Object 304, e.g., EventID 318, Source 320, Sequence 322, Handled 324, and Parameters 326 are specified with the information required for the event. Finally, the FireEvent 330 method of the EventManager Object 306 is called.

In addition to having the shape object 200 code use the above method to fire events, the shape author or 3rd party developer can also use this mechanism to fire events. They can either fire the predefined system events, or define their own user events, since all system events have EventID>0.

Event Routing and Bubbling

Event Manager Object 306 uses the following method to route an event to all event handlers 216.

EventManager Object 306 receives a call to FireEvent 330, passing in EventData Object 304 with a specified Source 320.

First, the EventManager Object 306 calls an OnEvent method on the source object 320 identified in the FireEvent 330 method. This allows the source object to execute some response to the event. The EventManager Object 306 then checks the status of the Handled 324 parameter in the EventData Object 304. If Handled 324 has a value of "True," then the event routing is done.

Next, the EventManager Object 306 then obtains the list of EventAction Objects 302 from the source object, and checks each EventAction Object 302 in turn to find one that is listening for the event 300 being routed. For each EventAction Object 302 the EventManager Object 306 finds, the EventManager Object 306 executes the code defined by the EventAction Object 302. If the EventAction Object 302 is a Script, then the appropriate script engine is used. If the EventAction Object 302 is a COM object, then the OnEvent method of the IAxEventHandler interface is called. The EventManager Object 306 checks the status of the Handled 324 parameter in the EventData Object 304 record. If Handled has a value of "True," then the event routing is done.

The EventManager Object 306 obtains the next object 200 in the object 200 hierarchy from the source object 200. This is typically the object's 200 parent. If the end of the hierarchy has been reached, then the event routing is done.

Finally, the EventManager Object 306 begins the process again, with the object in the previous step now taking the role of the source object 320.

Figure 4A:
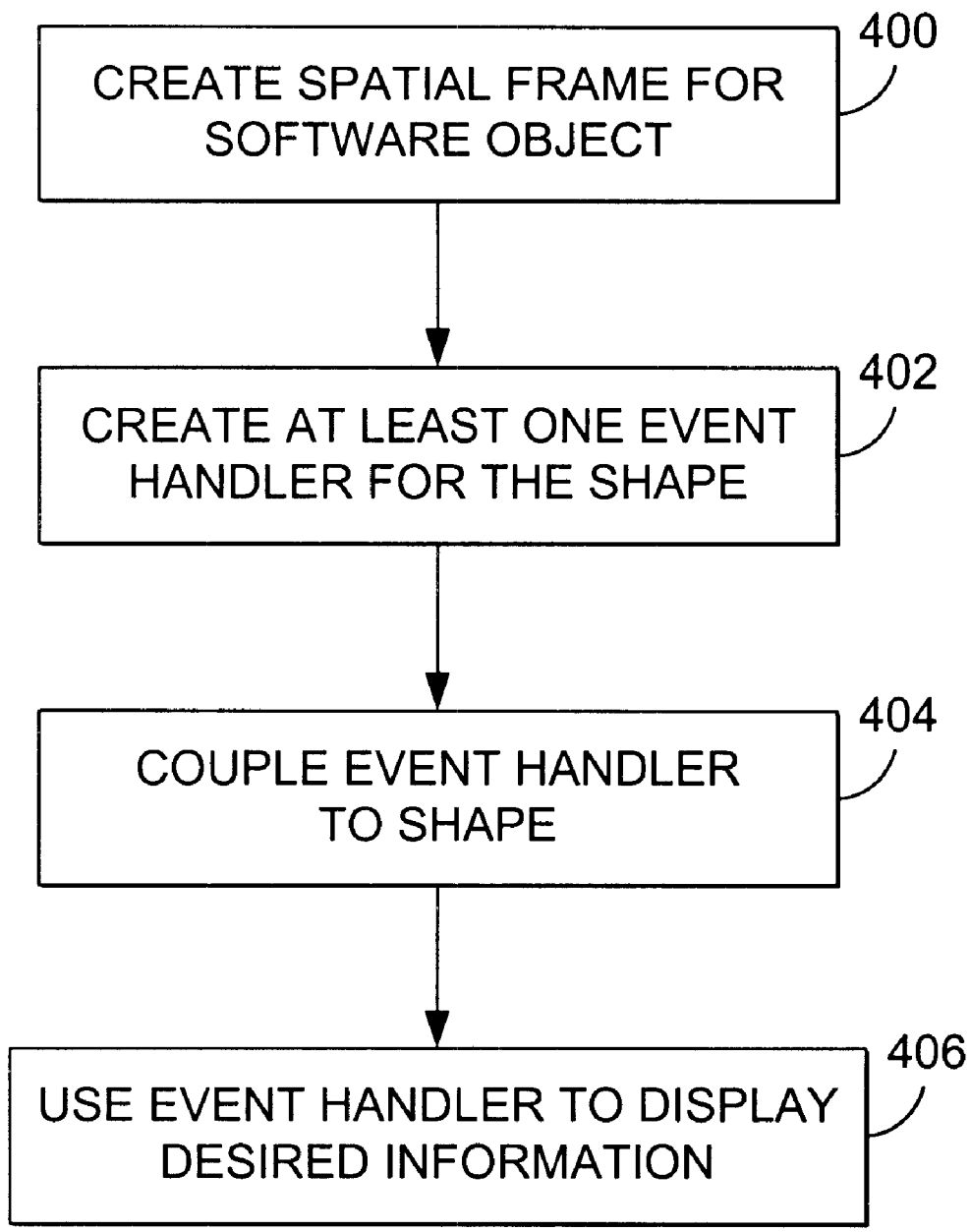
FIGS. 4A–4C are flowcharts that illustrate the general logic of performing the steps of the present invention.
Figure 4B:
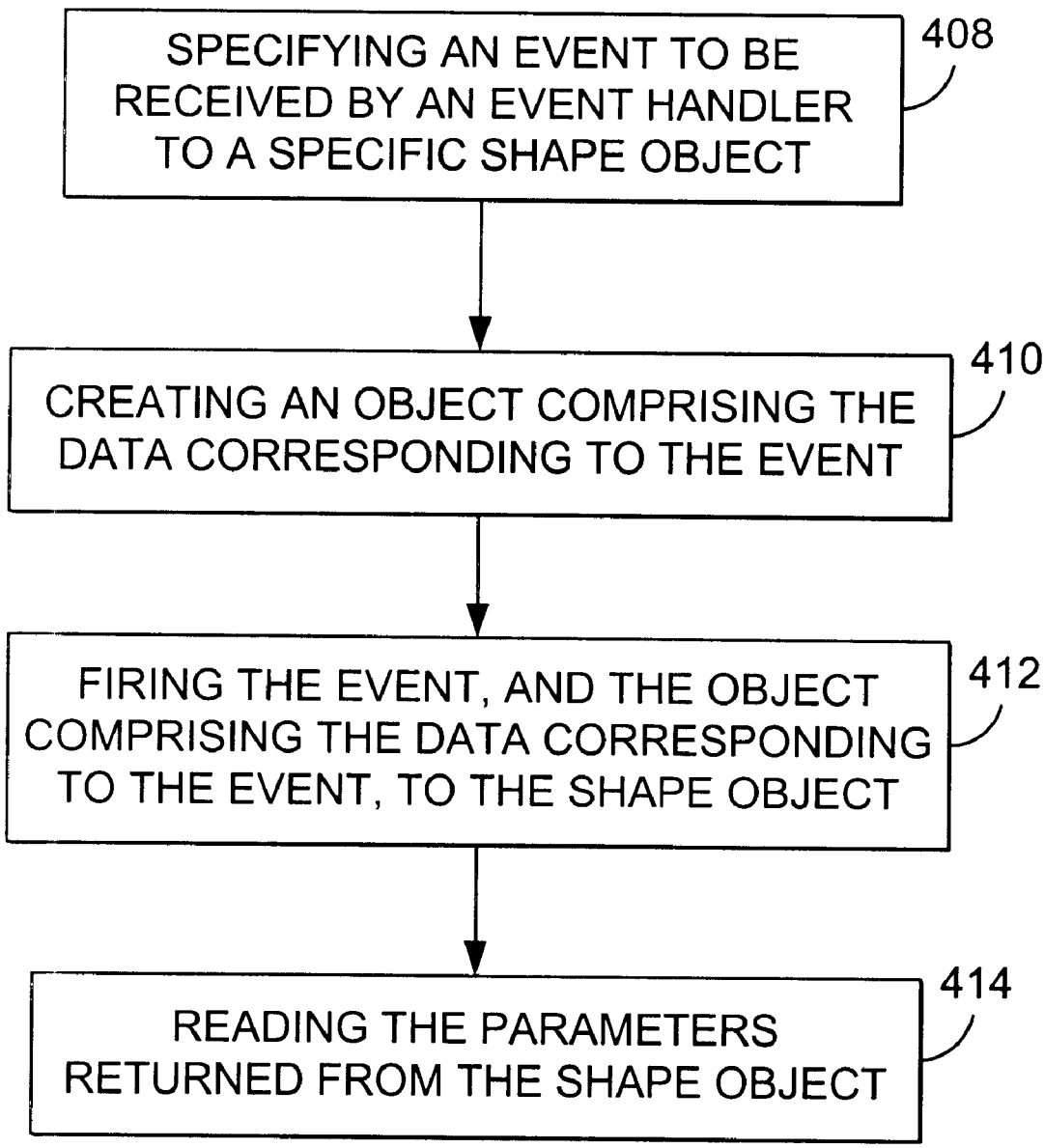
Figure 4C:
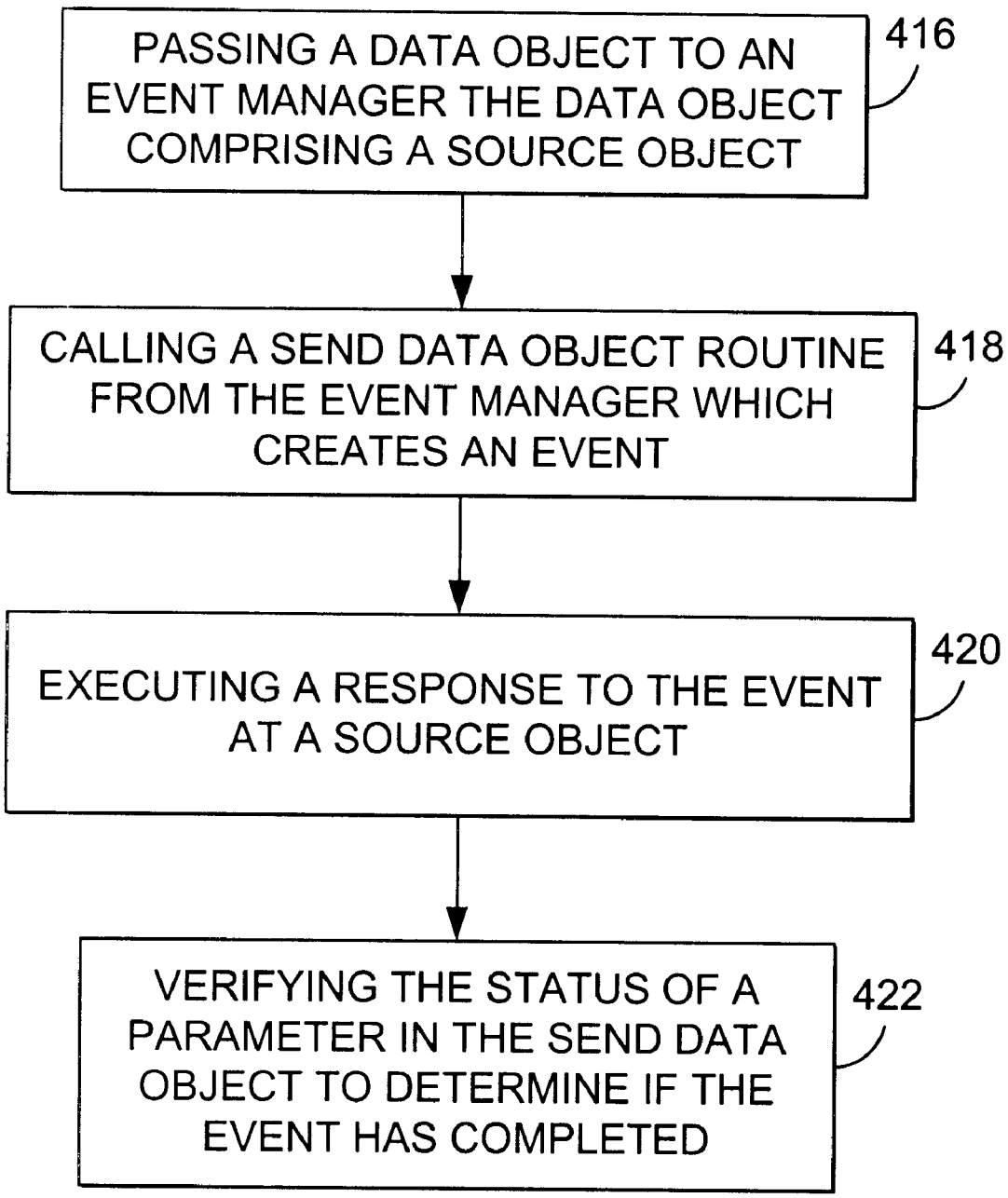

Flowcharts FIGS. 4A–4C are flowcharts that illustrate the general logic of performing the steps of the present invention.

Block 400 represents performing the step of creating a spatial frame of the shape wherein the spatial frame provides a mapping function for the shape and provides a geometric framework for the shape.

Block 402 represents performing the step of creating at least one event handler of the shape.

Block 404 represents performing the step of coupling the event to the shape.

Block 406 represents performing the step of using the event handler coupled to the shape to display desired information on the monitor.

Block 408 represents performing the step of specifying an event to be received by an event handler to a specific shape object.

Block 410 represents performing the step of creating an object comprising the data corresponding to the event.

Block 412 represents performing the step of firing the event, and the object comprising the data corresponding to the event, to the shape object.

Block 414 represents performing the step of reading the parameters returned from the shape object.

Block 416 represents performing the step of passing a data object to an event manager, the data object comprising a source object.

Block 418 represents performing the step of calling a send data object routine from the event manager, which creates an event.

Block 420 represents performing the step of executing a response to the event at a source object.

Block 422 represents performing the step of verifying the status of a parameter in the send data object to determine if the event has completed.

Conclusion

This concludes the description of the preferred embodiment of the invention. The following describes some alternative embodiments for accomplishing the present invention.

For example, any type of computer, such as a mainframe, minicomputer, workstation or personal computer, could be used with the present invention. In addition, any software program, application or operating system having a user interface could benefit from the present invention.

The above teaching also supports additional functions that may also be implemented using the intelligent shape objects of the present invention. In addition, the intelligent shapes can be integrated closely with each application program by any number of different methods.

In summary, the present invention discloses a method, apparatus, and article of manufacture for creating a shape to display information on a monitor of a computer. The method comprises the steps of creating a spatial frame of the shape wherein the spatial frame provides a mapping function for the shape and provides a geometric framework for the shape, creating at least one event handler of the shape, coupling the event handler to the shape, and using the event handler coupled to the spatial frame to display desired information on the monitor.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of creating a shape for displaying information on a monitor attached to a computer, comprising the steps of:

creating a spatial e of the shape wherein the spatial same provides a mapping function for the shape and provides a geometric framework for the shape;

creating at least one event handler of the shape;

coupling the event handler to the shape, wherein the event handler comprises a programming construct that responds to an event that is fired in association with a change in one or more properties of the shape;

using the event handler coupled to the shape to display desired information on the monitor.

2. The method of claim 1, wherein the event handler is provided by a script.

3. The method of claim 1, wherein the event handler is provided by a COM object.

4. The method of claim 1, further comprising the step of modifying the spatial frame to display desired information on the monitor.

5. The method of claim 1, wherein the event handler is coupled to the shape object through an event action object, an event data object, and an event manager object.

6. The method of claim 5, wherein the event data object encapsulates data for the event fired by the shape.

7. The method of claim 5, wherein the event action object associates the event handler with a specific shape.

8. The method of claim 5, wherein the event manager object controls a definition of the event, a firing of the event, and a bubbling of the event.

9. A computer-implemented apparatus for display information, comprising:

a computer having a monitor attached thereto;

means, performed by the computer, for creating a spatial of the shape wherein the spatial frame provides a mapping function for the shape and provides a geometric framework for the shape;

means, performed by the computer, for creating at least one event handler of the shape;

means, performed by the computer, for coupling the event handler of the shape to the spatial frame of the shape, wherein the event handler couples to the geometric framework of the spatial frame, and wherein tile event handler comprises a programming construct that responds to an event that is fired in association with a change in one or more properties of the shape; and means, performed by the computer, for using the event handler coupled to the spatial frame to display desired information on the monitor.

10. An article of manufacture comprising a computer program carrier readable by a computer and embodying one or more instructions executable by the computer to perform method steps of displaying information on a monitor attached to the computer, the method comprising the steps of:

creating a spatial frame of the shape wherein the spatial frame provides a mapping function for the shape and provides a geometric framework for the shape;

creating at least one event handler of the shape;

coupling the event handler of the shape to the spatial frame of the shape, wherein the event handler couples to the geometric framework of the spatial frame, and wherein the event handler comprises a programming construct that responds to an event that is fired in association with a change in one or more properties of the shape; and using the event handler coupled to the spatial frame to display desired information on the monitor.

11. A method of manipulating a shape object displaying information on a monitor attached to a computer, comprising the steps of:

specifying an event to be received by an event handler to a specific shape object;

creating an object comprising the data corresponding to the event;

firing the event, and the object comprising the data corresponding to the event, to the shape object; and reading the parameters returned from the shape object.

12. The method of claim 11, wherein the step of specifying is performed using an EventAction Object.

13. The method of claim 11, wherein more than one event is specified and fired by an event handler to a specific shape object.

14. The method of claim 11, wherein the event is owned by at least one of the group comprising plugs, sockets, handles, properties, custom commands, and shape objects.

15. The method of claim 11, wherein more than one event handler is associated with the event.

16. A method for routing an event to an event handler in a computer, comprising the steps of:

passing a data object to an event manager, the data object comprising a source object;

calling a send data object routine from the event manager, which creates an event;

executing a response to the event at a source object; and verifying the status of a parameter in the send data object to determine if the event has completed.

17. The method of claim 16, further comprising the steps of obtaining a list of event actions from the source object;

checking each event action from the list of event actions to determine each event that is being routed; and executing commands defined by the routed events.

18. The method of claim 16, further comprising the steps of:

obtaining a next source object in an object hierarchy from the source object; and continuing to execute commands defined by the routed events until there are no additional next source objects.

* * * * *

UNITED STATES PATENT AND TRADEMARK OFFICE
CERTIFICATE OF CORRECTION

PATENT NO.     : 6,512,519 B1                                            Page 1 of 1
DATED          : January 18, 2003
INVENTOR(S)    : David Wayne Arsenault et al.

It is certified that error appears in the above-identified patent and that said Letters Patent is hereby corrected as shown below:

<u>Column 12,</u>
Line 56, "e" should read -- frame --
Line 56, "same" should read -- frame --

<u>Column 13,</u>
Line 16, "display" should read -- displaying --
Line 20, before "of" insert -- frame --
Line 29, "tile" should read -- the --

Signed and Sealed this

Fifth Day of August, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,512,519 B1
DATED         : January 28, 2003
INVENTOR(S)   : David Wayne Arsenault et al.

Page 1 of 1

It is certified that error appears in the above-identified patent and that said Letters Patent is hereby corrected as shown below:

<u>Column 12,</u>
Line 56, "e" should read -- frame --
Line 56, "same" should read -- frame --

<u>Column 13,</u>
Line 16, "display" should read -- displaying --
Line 20, before "of" insert -- frame --
Line 29, "tile" should read -- the --

This certificate supersedes Certificate of Correction issued August 5, 2003.

Signed and Sealed this

Twenty-fifth Day of November, 2003

JAMES E. ROGAN
*Director of the United States Patent and Trademark Office*